Oct. 14, 1941.  F. W. ANDREW  2,259,193
AUTOMATIC TRACTOR CONTROL
Filed April 26, 1940   3 Sheets-Sheet 1

Inventor
FRANK WINSTON ANDREW,

By Clarence A O'Brien
and Hyman Berman
Attorneys

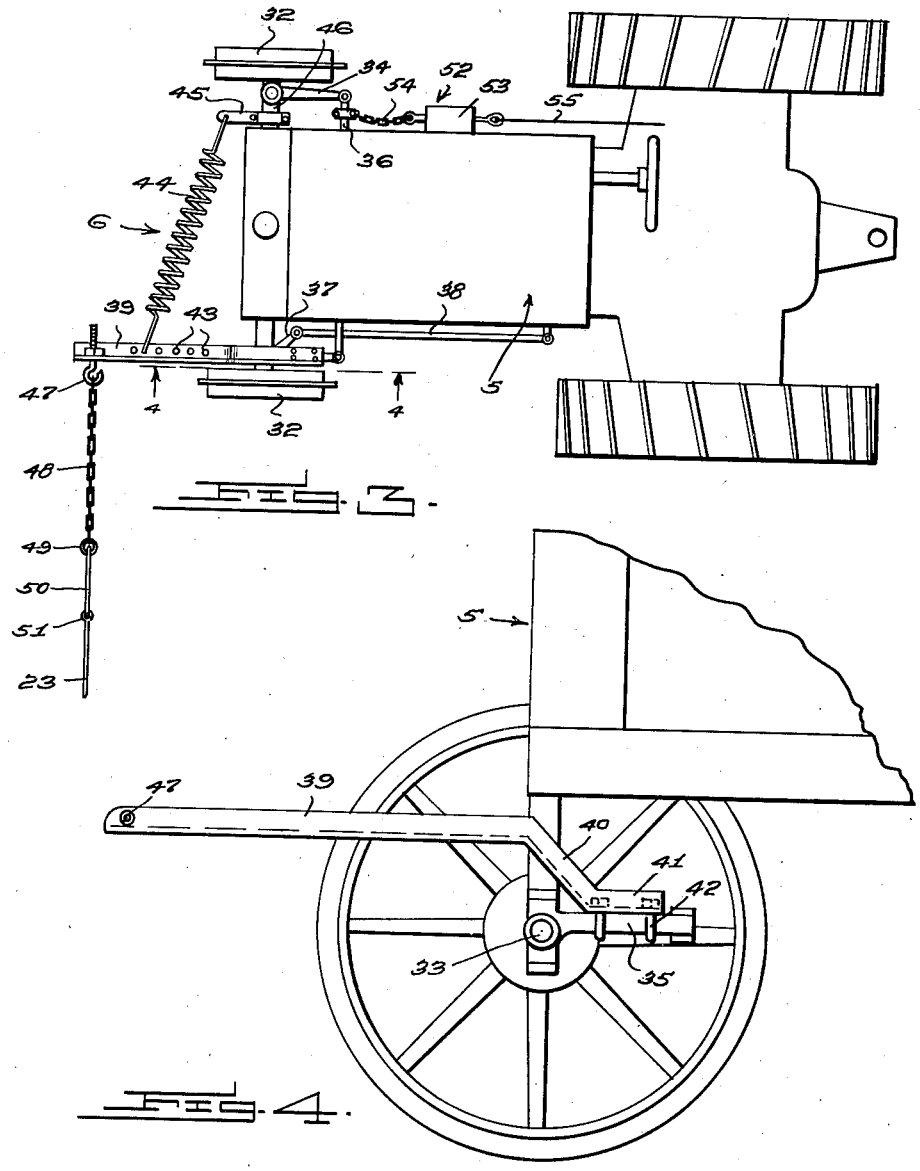

Oct. 14, 1941.  F. W. ANDREW  2,259,193
AUTOMATIC TRACTOR CONTROL
Filed April 26, 1940   3 Sheets-Sheet 3
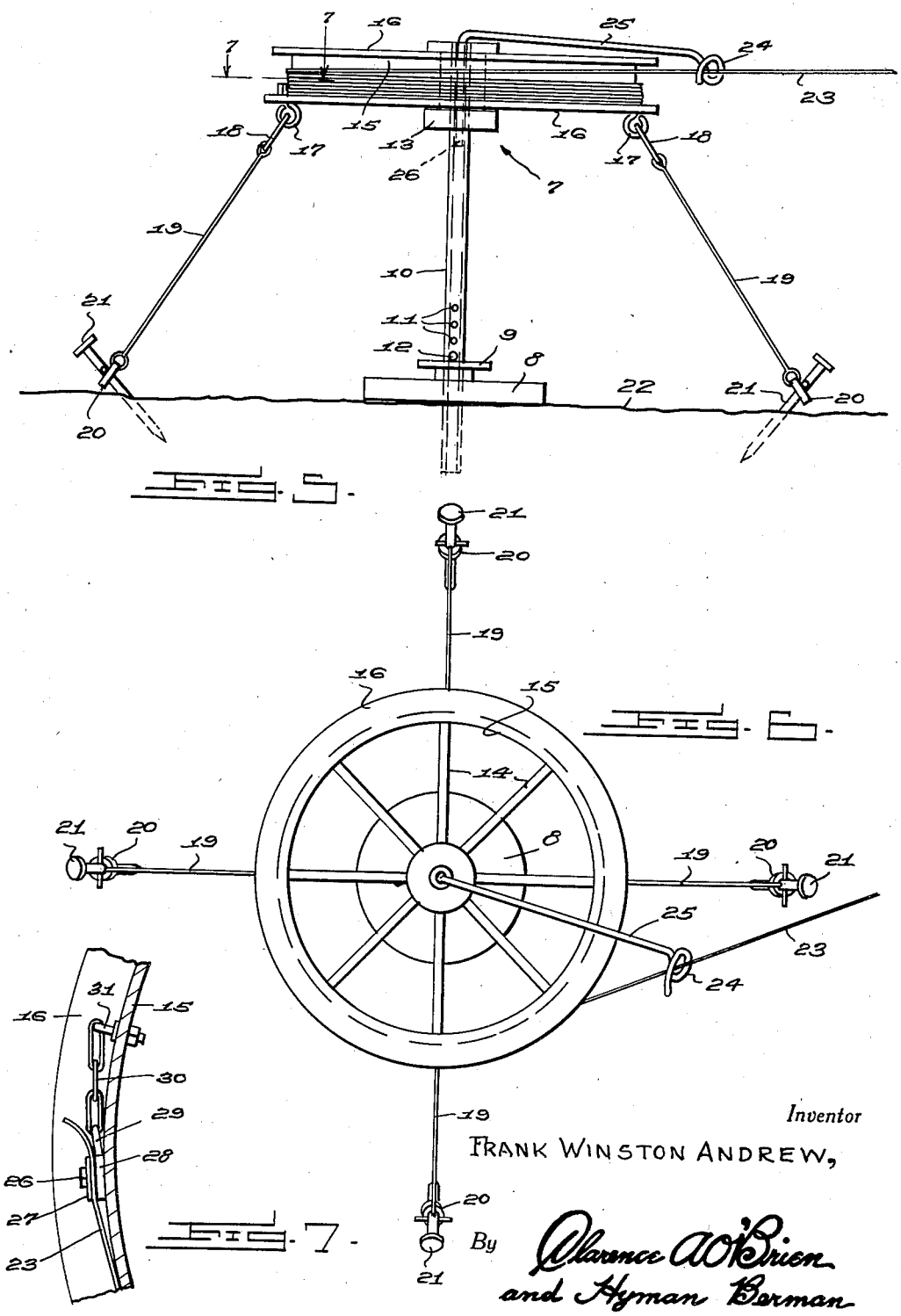
Inventor
FRANK WINSTON ANDREW,
By Clarence A. O'Brien
and Hyman Berman
Attorneys Patented Oct. 14, 1941

2,259,193

UNITED STATES PATENT OFFICE 2,259,193

AUTOMATIC TRACTOR CONTROL

Frank Winston Andrew, Palmyra, Ill.

Application April 26, 1940, Serial No. 331,851

1 Claim. (Cl. 180—79)

This invention relates to new and useful improvements in control means for farm tractors, the principal object of the invention being to automatically control farm tractors in field operations.

Another important object of the invention is to provide an automatic control for farm tractors to the end that a tractor can be employed for plowing an area of farm land in an automatic manner and without human attention.

Another important object of the invention is to provide an automatic farm tractor control which in operation will be practical and substantially fool-proof and which will involve automatic means for cutting off the ignition in the event the tractor starts to run wild.

These and other important objects and advantages of the invention will become apparent to the reader of the following specification.

In the drawings:

Figure 3 is a fragmentary top plan view showing the control means on the tractor.

Figure 4 is a sectional view taken substantially on the line 4—4 of Figure 3.

Figure 5 is a side elevational view of the drum assembly.

Figure 6 is a top plan view of the drum assembly.

Figure 7 is a fragmentary enlarged detailed sectional view on the line 7—7 of Figure 5.

Figures 1, 2:
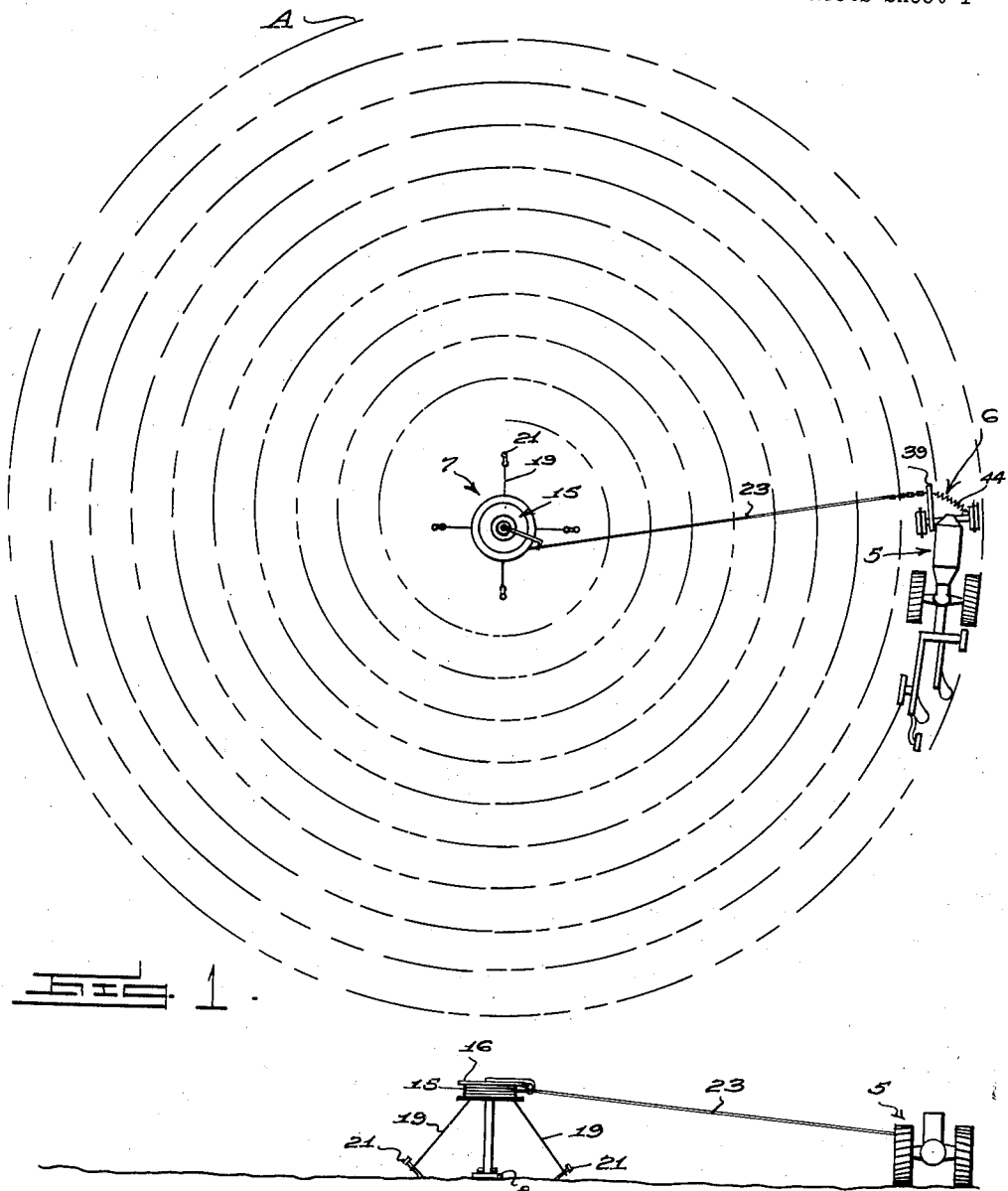
Figure 1 represents a top plan view disclosing the entire apparatus.
Figure 2 is a side elevational view of the entire apparatus as shown in Figure 1.

Referring to the drawings wherein like numerals designate like parts, it can be seen in Figure 1 that the numeral 5 generally refers to the conventional tractor, at the front of which is the control mechanism 6 connected with the drum assembly 7.

The drum assembly 7 is to be situated amidfield and consists of the base 8 having the collar 9 rising therefrom and through this collar and base 8 is disposed the hollow post 10 which has openings 11 therein for accommodating a pin 12 and obviously this pin can be inserted through any one of the openings 11 to regulate the height of the post 10 above the base 8.

At the upper end of the post 10 is the spool-like structure 13 serving as a hub from which the spokes 14 extend to connect the drum 15, this drum 15 having the side flanges 16—16.

Hook members 17 (preferably four in number) depend from the lower flange 16. Over these hooks are disposed the eyes or rings 18 at the upper ends of the cable sections 19. The lower ends of these cable sections 19 have rings 20 through which the stakes 21 are driven and into the ground 22. Thus the drum assembly is braced and the drum proper 15 is prevented from rotation.

Numeral 23 represents the high tensile strength metallic cable which extends through the eye 24 of the guide arm 25, the latter having the depending shank 26 depending into the upper portion of the hollow post 10 so that the arm 25 can freely rotate.

It can be seen in Figure 7, the cable or wire 23 is clamped by the screw or bolt 26 between the plate 27 and block 28, the latter having the eye 29 linked with one end of the chain section 30. The other end of the chain section 30 is disposed through the anchored eye bolt 31. Thus the drum assemly end of the line 23 is attached to the drum.

The tractor 5 is of generally conventional construction, the same involving the usual magneto ignition (not shown) and having the steerable wheels 32—32. These wheels 32—32 are mounted on stub shafts 33 and from these extend the rearwardly disposed arms 34—35 connected by the connecting rod 36 of the steering mechanism, the latter further including the drag bar arm 37 and drag bar 38.

In carrying out the details of the control mechanism 6, it can be seen that an elongated angle bar 39 is employed, the same projecting forwardly from the tractor and having its rear end portion offset downwardly as at 40 and rearwardly as at 41. U-clamp bolts 42 clamp this extended portion 41 to the steering arm 35 as substantially shown in Figure 4.

The intermediate portion of the horizontal flange of the angle bar 39 is formed with a plurality of openings 43 through any one of which can be disposed the adjacent end of the coiled tension spring 44, the other end of the spring being connected to the arm 45 which, in turn, is clamped as at 46 to the front axle bar of the tractor.

A hook bolt 47 at the forward end of the angle bar 39 has the chain section 48 extending therefrom and connected by the ring 49 to the short length 50 of wire, the latter in turn being connected to the main line 23 as at 51. This short length 50 of wire is interposed as a safety factor to prevent rupture of the line 23. The section or length 50 is of less tensile strength than the line 23 so that in the event of a super-load on the line 23, the short easily replaceable section 50 will rupture and thus save the line 23.

As can be seen in Figure 1, the tractor will, for instance, start at the point A and in traveling the line 23 will be gradually wound on to the drum 15. Any tendency of the tractor to cut in toward the drum 15 off of its contemplated spiral line of travel will be compensated or rectified by the presence of the tension spring 44.

In the event the line 23 should break and the tractor is free to travel, to prevent any damage, the automatic means generally referred to by numeral 52 is employed. This consists of a switch 53 which can be operated either by the chain 54 to the connecting rod 36 of the steering mechanism, or by the line 55 to the implement hitch (not shown). In the event the implement hitch becomes disrupted the switch 53 will be operated and in the event the cable 23 breaks, the support will straighten the steering mechanism connecting rod 36 loosening the chain 54 so that the switch 53 will automatically operate to stop the tractor automatically as it serves to short the primary circuit of the ignition magneto (not shown).

Furthermore this switch can also be employed to automaticaly stop the tractor as it approaches in close proximity to the drum assembly. Due to the greater angle of the wheels as the field becomes smaller, the switch is pulled, stopping the tractor before it winds itself completely around the drum causing damage.

While the foregoing specification sets forth the invention in specific terms, it is to be understood that numerous changes in the shape, size and materials may be resorted to without departing from the spirit and scope of the invention as claimed hereinafter.

Having described the invention what is claimed as new is:

In combination, a drum, a tractor, said tractor including a steering mechanism, an arm extending from the steering mechanism, a line having one end connected to the drum, and its opposite end connected to the arm, and tensioning means tending to pull the arm in a direction opposite from the pull exerted by the line, a tractor control switch, and a connection between the tractor control switch and the said mechanism for operating the switch upon straightening of the steering mechanism.

FRANK WINSTON ANDREW.